(12) United States Patent
Metz et al.

(10) Patent No.: US 8,189,750 B2
(45) Date of Patent: May 29, 2012

(54) SYSTEM AND METHOD FOR TRACKING CALL ACTIVITY TO A SET OF ADVERTISED BUSINESSES

(75) Inventors: Brent D. Metz, New York, NY (US); Kevin Caffrey, New York, NY (US)

(73) Assignee: Yext, Inc., New York, NY (US)

( * ) Notice: Subject to any disclaimer, the term of this patent is extended or adjusted under 35 U.S.C. 154(b) by 1034 days.

(21) Appl. No.: 12/107,547

(22) Filed: Apr. 22, 2008

(65) Prior Publication Data
US 2009/0262913 A1    Oct. 22, 2009

(51) Int. Cl.
    *H04M 11/00*    (2006.01)
(52) U.S. Cl. ............... 379/100.06; 379/32.05; 379/133; 379/384; 455/9; 705/14.6
(58) Field of Classification Search ............. 379/112.01, 379/32.01, 32.04, 32.05, 100.05, 100.06, 379/114.01, 114.17, 133, 270, 383, 384; 705/26.1, 14.49, 14.6; 307/11; 455/9, 404.2
    See application file for complete search history.

(56) References Cited

U.S. PATENT DOCUMENTS
2004/0174071 A1*  9/2004  Nierlich et al. ................. 307/11
2008/0086384 A1*  4/2008  Srinivasan et al. .............. 705/26
* cited by examiner

*Primary Examiner* — Md S Elahee
(74) *Attorney, Agent, or Firm* — Lowenstein Sandler, PC

(57) ABSTRACT

A system and method for tracking call activity of a plurality of businesses is disclosed. A global pool of phone numbers is allocated from which to draw numbers. A business-specific pool of numbers is established for business locations involved in advertisements using the Internet via Web pages. As a consumer begins viewing an advertisement for a business, a number is temporarily allocated from the business's pool of available numbers. As the business's pool of unallocated numbers is exhausted, a metric is used to determine whether or not to grow the pool of numbers, to show an untracked 'fallback' number for the business, or to reuse a previously allocated number. When one of the temporarily allocated numbers is called, the online consumer it was associated with is credited for making the call and the business is credited and charged for receiving the call. This method of allocating and presenting numbers with all numbers ultimately being tied to the same business ensures that even if a consumer calls a number much later after it has been re-allocated, that the number will still ring to the correct business.

36 Claims, 6 Drawing Sheets

FIG. 2A

| Tracking Number | Allocation |
|---|---|
| 703-123-0001 | Allocated to Awesome Gym |
| 703-123-0002 | Unallocated |
| ... | |
| 703-123-1000 | Unallocated |

FIG. 2B

| Location | Monthly Location Displays | Max Pool Size | Real Number | Our Fallback Tracking Number |
|---|---|---|---|---|
| Awesome Gym | 5,000 | 500 | 703-555-4967 | 703-234-0001 |
| | | | | |

46

| Our Number | Allocation Date | Last Good Call |
|---|---|---|
| 703-123-0001 | 2/15/2008 4:00:00 PM | 2/20/2008 10:00:00AM |
|  |  |  |

| Our Number | Media Visitor | Media Source | Allocation Date | Reallocation Availability Date |
|---|---|---|---|---|
| 703-123-0001 | Bob Jones | Google Ads for awesomeness | 2/15/2008 4:00:00 PM | 2/15/2008 6:00:00 PM |
| 703-123-0001 | John Smith | Google Ads for gyms | 2/20/2008 09:00:00 AM | 2/20/2008 11:00:00 AM |
|  |  |  |  |  |

FIG. 2D

SYSTEM AND METHOD FOR TRACKING CALL ACTIVITY TO A SET OF ADVERTISED BUSINESSES

FIELD OF THE INVENTION

The present invention relates generally to tracking of online advertising, and more particularly to a system and method for tracking call activity to a set of advertised businesses.

BACKGROUND OF THE INVENTION

The Internet has seen a boom in the proliferation of online business sites since the inception of consumer-friendly browsers for accessing the World Wide Web. Some businesses market products directly to customers on their Web browsers. Other websites may exist for non-business purposes, such as online periodicals and news sites that survive by means of online advertising. An online advertisement may include a telephone number to call a business. Marketers who advertise for businesses want to be able to track the performance of their telephone numbers listed in advertisements by comparing the number of times the phone number was viewed by a consumer with the number of times it was called. To optimize their media spend return on investment (ROI), online marketers in particular wish to identify exactly which consumer who saw a number online ended up calling a business.

At one extreme, a single phone number is assigned to a single business regardless of the location of the consumer. All consumers from a number of locations would call the same number, so no single consumer and no single geographical area can be tracked. At the other extreme, a business is unlikely to be able to handle and afford a very large amount of advertised telephone numbers, each number being assigned to a single consumer. Even if 100,000 telephone numbers were allocated to a marketer for distribution to a business they were advertising on behalf of, it would be impractical to track 100,000 unique phone numbers.

To resolve this dilemma in the prior art, when an Internet a marketer tracks callee statistics for a business, a single tracking phone number is allocated to a business. A marketer would obtain a new number in the same area code as the business. If the consumer sees that number advertised online and calls that number, the number still rings the business even though it is not the business's number. The marketer receives the call first, and then forwards the call to the business. Since the call is registered with the marketer and assigned to a business, that business is given credit for the call. The business would then be charged a certain amount of money for a given number of calls. Unfortunately, for this method, there is no concept of rotation of phone numbers on a per consumer basis. The number of times the delegated phone number was viewed versus how many times it was called cannot be tracked.

Accordingly, what would be desirable, but has not yet been provided, is a system and method that ties consumers who called a business back to consumers who viewed the business online by using multiple phone number pools to dynamically allocate numbers to consumers. It would also be desirable to have a method of reallocating phone numbers to different consumers for the same business such that when a phone number is called by a recently de-allocated consumer, that number still rings the same business.

SUMMARY OF THE INVENTION

The above-described problems are addressed and a technical solution is achieved in the art by providing system and method for tracking call activity of a plurality of businesses, wherein the system is configured to execute the steps of deriving a business-specific pool of tracking telephone numbers from a global pool of tracking telephone numbers associated with the plurality of businesses, the business-specific pool being associated with one business of the plurality of businesses; receiving an indication that a consumer has viewed a Web site associated with the one business, searching for at least one tracking telephone number associated with the one business in the business-specific pool, the at least one tracking telephone number having an expiration date; and sending the at least one tracking telephone number to the Web site when the at least one tracking telephone number is found that has an expiration date that has passed. When the at least one tracking telephone number is found and the expiration date has passed, the system is further configured for receiving a call using the at least one tracking telephone number from the consumer; associating the consumer with the at least one tracking telephone number; assigning a new expiration date to the at least one tracking telephone number; forwarding the call to the one business; and crediting the one business for the call. The system is further configured for re-allocating the at least one tracking telephone number to a second consumer for the one business after the new expiration date has expired; receiving a call using the at least one tracking telephone number from the consumer, forwarding the call to the one business; and crediting the one business for the call. Even when the consumer has viewed the at least one tracking telephone number but does not call the at least one tracking telephone number by the expiration date, if the consumer subsequently calls the at least one tracking telephone number, the system still forwarding the call to the one business.

The at least one tracking telephone number whose expiration date has passed can be the tracking telephone number associated with the one business with the oldest expiration date among a list of tracking telephone numbers whose expiration dates have expired. The expiration date can be calculated based on impression volume and a business-specific coefficient.

The system can further be configured for, when no tracking telephone number associated with the one business having an expiration date that has passed has been found: determining if the maximum number of allowed tracking telephone numbers in the business-specific pool for the one business has been exceeded; and showing a fallback tracking telephone number to the consumer when the maximum number of allowed tracking telephone numbers has been exceeded. When the maximum number of allowed tracking telephone numbers in the business-specific pool for the one business has been exceeded, the system is further configured for searching for an unallocated tracking telephone number in the global pool of tracking telephone numbers; showing the fallback tracking telephone number to the consumer when there are no unallocated tracking telephone numbers in the global pool of tracking telephone numbers; otherwise inserting a new tracking telephone number to the business-specific pool of tracking telephone numbers for the one business from the global pool; associating the consumer with the new tracking telephone number; assigning a new expiration date to the new tracking telephone number; and sending the new tracking telephone number to the Web site. Alternatively, the system is further configured for searching for an unallocated tracking telephone number in the global pool of tracking telephone numbers; attempting to purchase an additional number from a third party telephone provider; showing the fallback tracking telephone number to the consumer when an additional number from a third party telephone provider cannot be purchased; otherwise purchasing an additional number from a third party telephone provider; incrementing a maximum number of tracking telephone numbers that are allocated to the one business; inserting a new tracking telephone number to the business-specific pool of tracking telephone numbers for the one business from the global pool; associating the consumer with the new tracking telephone number; assigning a new expiration date to the new tracking telephone number; and sending the new tracking telephone number to the Web site. In yet other embodiments, the system is further configured for searching for an unallocated tracking telephone number in the global pool of tracking telephone numbers; determine if a toll-free number can be allocated to the one business; showing the fallback tracking telephone number to the consumer when a toll-free number cannot be allocated to the one business; otherwise sending the toll-free number to the Web site.

Determining if a toll-free number can be allocated to the one business can be based on a calculation involving impression volume and a business-specific coefficient. The at least one tracking telephone number can be de-allocated from the business-specific pool for the one business after a predetermined amount of time and can be later reused by placing the at least one tracking telephone number back in the global pool of tracking telephone numbers.

BRIEF DESCRIPTION OF THE DRAWINGS

The present invention will be more readily understood from the detailed description of an exemplary embodiment presented below considered in conjunction with the attached drawings, of which:

FIG. 2A is a global allocation table that stores a list of numbers owned by the marketer for a given geographical area;

FIG. 2B is a location table that stores information about each of the businesses in a given geographical area that subscribes to the allocation service offered by a marketer;

FIG. 2C is an advertised business table that stores information about a single business;

FIG. 2D is a master log table that tracks allocation information for the businesses and consumers.

It is to be understood that the attached drawings are for purposes of illustrating the concepts of the invention and may not be to scale.

DETAILED DESCRIPTION OF THE INVENTION

In an illustrate embodiment of the present invention, a global pool of phone numbers is allocated from which to draw numbers. A business-specific pool of numbers is established for business locations involved in advertisements using the Internet via Web pages. As a consumer begins viewing an advertisement for a business, a number is temporarily allocated from the business's pool of available numbers. As the business's pool of unallocated numbers is exhausted, a metric is used to determine whether or not to grow the pool of numbers, to show an untracked 'fallback' number for the business, or to reuse a previously allocated number. When one of the temporarily allocated numbers is called, the online consumer it was associated with is credited for making the call and the business is credited and charged for receiving the call. This method of allocating and presenting numbers with all numbers ultimately being tied to the same business ensures that even if a consumer calls a number much later after it has been re-allocated, that the number will still ring to the correct business.

Figure 1:
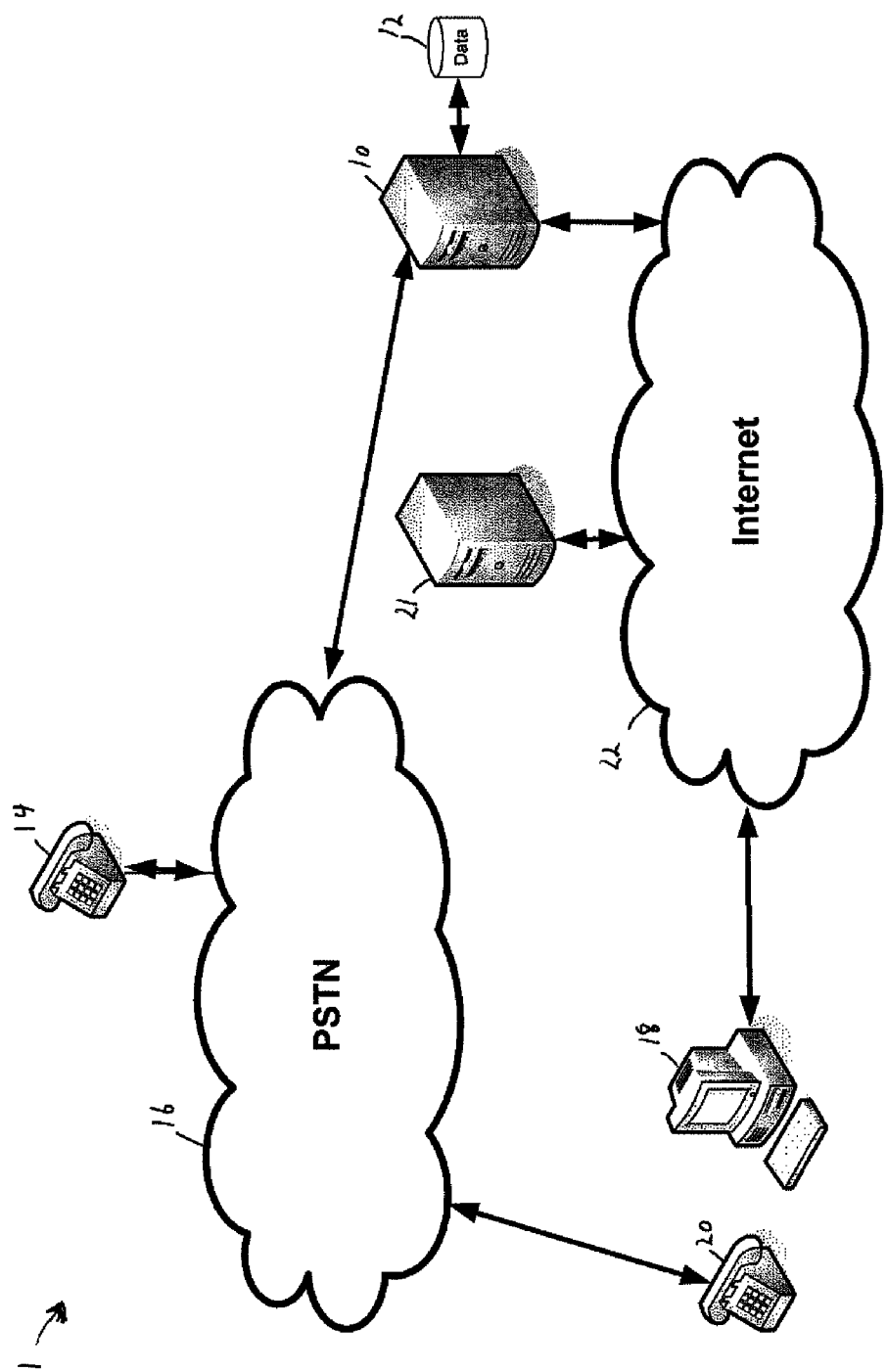
FIG. 1 is a block diagram of a system for dynamically allocating and tracking call activity to a set of advertised businesses, constructed in accordance with an embodiment of the present invention.

Referring now to FIG. 1, there is shown a system 1 for dynamically allocating and tracking call activity to a set of advertised businesses, constructed in accordance with an embodiment of the present invention. The system 1 includes a server 10 associated with a marketer (hereinafter, the marketer 10), the server 10 being associated with a data store 12. The server 10 comprises at least one processor and may comprise a personal computer, a work station, a mainframe computer, or any other device having enough processing power for carrying out the present invention. The data store 12 stores a number of tables for tracking and allocating telephone numbers assigned to one or more telephones 14 associated with advertised businesses (hereinafter, the businesses 14) to be described in connection with FIGS. 2A-2D hereinbelow. Each of the businesses 14 and the server 10 may communicate with the public switched telephone network (PSTN) 16. There is also shown a computer 18 and a telephone 20 associated with a consumer (hereinafter, the consumer 20). The consumer 20 views a Web site on the computer 18 via one or more Web servers 21 over the Internet 22, the one or more Web servers 21 storing Web pages belonging to the businesses 14. Note that the marketer 10, the business 14, and the consumer 20 may employ the services of separate or a shared Web server 21 located on the Internet 22.

In operation, the server 10 reads from and may make entries into the data store 12 for assigning a tracking telephone number to one of the businesses 14 and for loading the tracking telephone number into an advertisement on a webpage associated with the one of the businesses 14 via the Web server 20, the tracking telephone number being intended only for the consumer 20 that views that web page. The tracking telephone number is allocated from a pool of telephone numbers stored in the data store 12 according to the algorithm of the present invention, the tracking telephone number being distinct from the actual telephone number of the business 14 but nevertheless rings to the telephone of the business 14.

The consumer 20 may place a call to the businesses 14 using the using the PSTN 16 after viewing the tracking telephone number on at least one of the Web pages. The resulting telephone call is intercepted by the server 10, which then consults the data store 12 to find the business number associated with the tracking telephone number. If found, the business 14 is credited with the call, and the marketer server forward the call via the PSTN 16 to the business number of the business 14.

Referring to FIGS. 1 and 2A-2D, there is shown a plurality of tables for storing and allocating tracking telephone numbers to the businesses 14 of FIG. 1. In FIG. 2A, a global allocation table 24 located in the data store 12 contains a list of numbers owned by the marketer 10 for a given geographical area. Each entry 26 in the global allocation table 24 contains a field 28 for a tracking telephone number and a field 30 designating whether and to whom (of the businesses 14) it has been allocated.

In FIG. 2B, a location table 32 located in the data store 12 contains information about each of the businesses 14 in a given geographical area that subscribes to the allocation service offered by the marketer 10. Each entry 34 in the location table 32 contains a field 36 assigned to a business 14, a field 38 listing the number of views (page hits) that the business 14 receives per month on its web site, also known as impression volume, a field 40 listing the maximum number of tracking telephone numbers that can be allocated to the business 14, a field 42 listing the actual telephone number of the business 14, and a field 44 listing a fallback tracking telephone number assigned to the business 14. The maximum number of tracking telephone numbers assigned to a business 14 depends upon the business's volume of business and geographical location, e.g., a business located in Juneau, Ak. will generally have a lower maximum number of allocated tracking telephone numbers than a similar business located in New York City. In some embodiments, the maximum number of allocated tracking telephone numbers may grow or shrink with impression volume or by means of other factors. In a preferred embodiment, the maximum number of allocated tracking telephone numbers is pre-assigned and does not change. If the number of requested tracking telephone numbers exceeds the maximum number of allocated tracking telephone numbers, then the fallback number is used for all subsequent calls to business 14. In such circumstances, the marketer 10 can no longer associate a particular viewer with a specific telephone number; nevertheless, the business 14 is still credited for the call.

In FIG. 2C, an advertised business table 46 located in the data store 12 contains information about a single business 14. Each entry 48 in the advertised business table 46 contains a field 50 listing an allocated tracking telephone number, a field 52 listing the date and time when the tracking telephone number was allocated, and a field 54 listing the date and time of the last call to the allocated tracking telephone number. The number of entries in the advertised business table 46 can grow from a minimum of zero entries to the maximum number of allocated tracking telephone numbers listed in field 40 of the location table 32 of FIG. 2B. In some embodiments, the number of entries can decrease, i.e., tracking telephone numbers can be de-allocated after a predetermined (usually long) period of time. This de-allocated tracking telephone number can be later reused by placing it back in the global pool of tracking telephone numbers.

In FIG. 2D, a master log table 56 located in the data store 12 tracks allocation information for the businesses 14 and the consumers 20. Each entry 58 in the location table 56 contains a field 60 listing an allocated tracking telephone number; a field 62 listing a consumer 20 that called the tracking telephone number in the field 60 after viewing an add on a Web site belonging to the businesses 14; a field 64 listing the business 14 associated with the tracking telephone number; a field 66 listing the allocation date/time when the tracking telephone number was temporarily leased to the consumer 20; and a field 68 listing the date/time at which point the tracking telephone number can be re-leased to another consumer 20.

Figure 3:
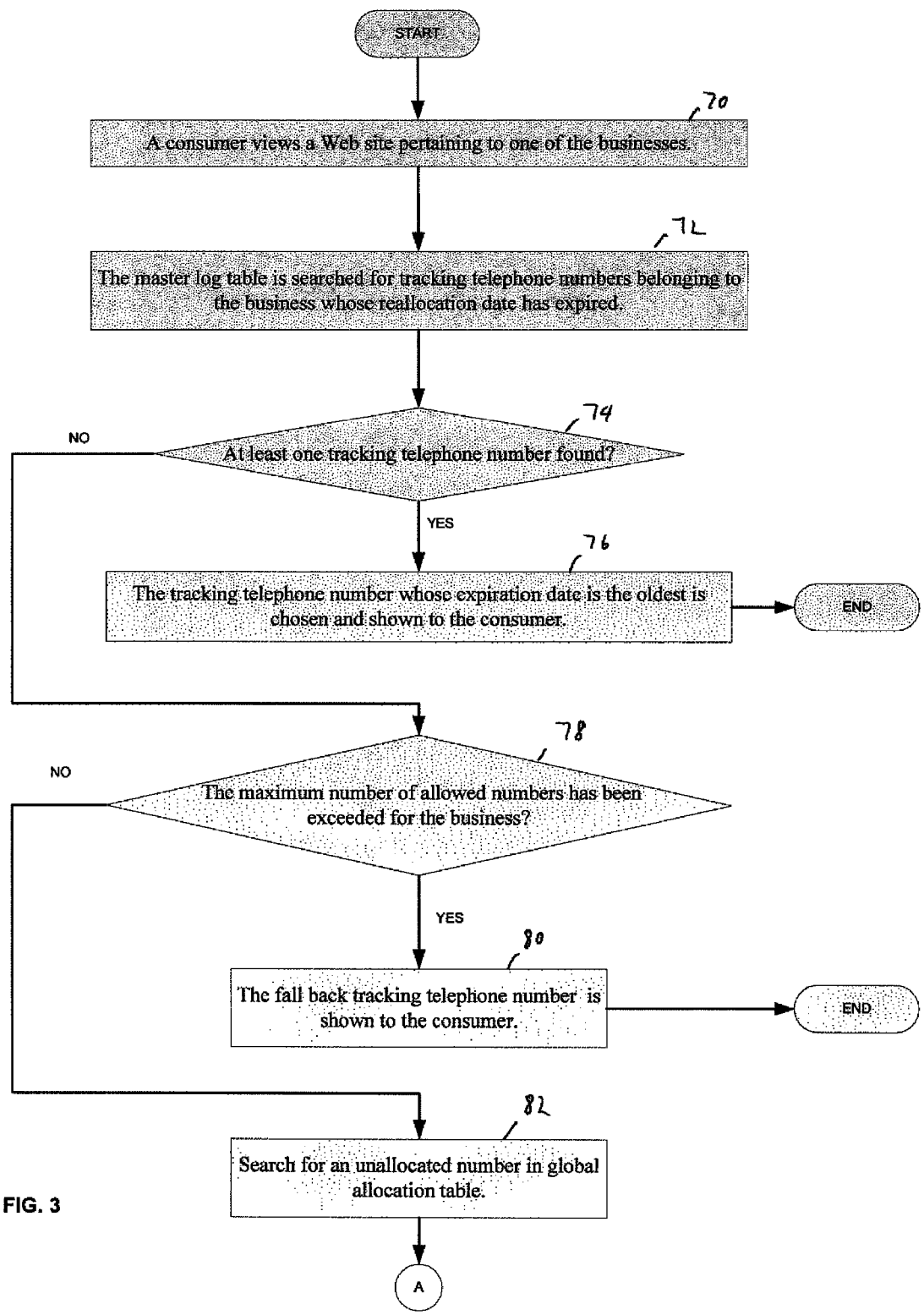
FIG. 3 is a flow diagram depicting a method for dynamically allocating and tracking call activity to a set of advertised businesses, constructed in accordance with the system of FIG. 1.
Figure 3:
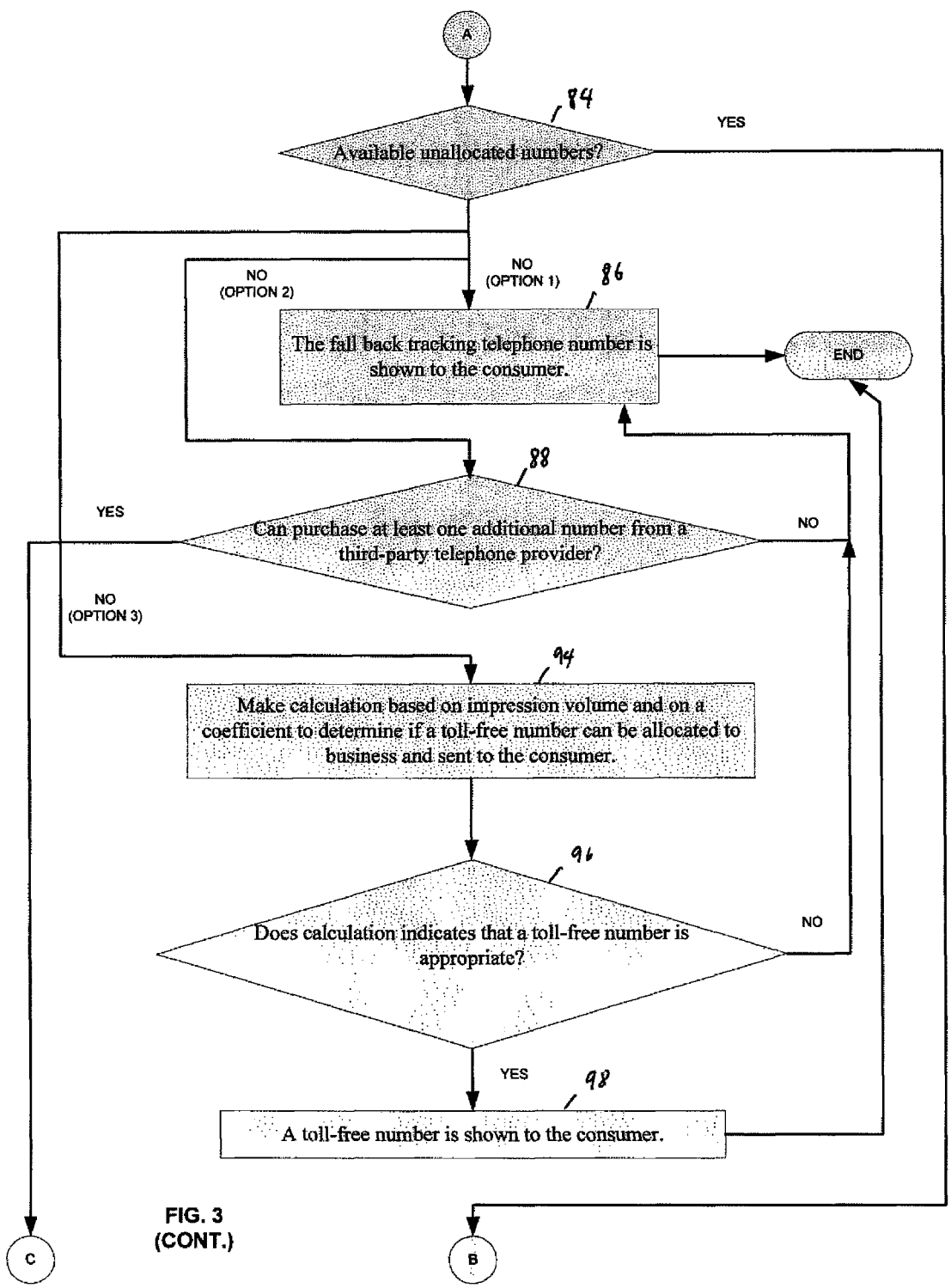
Figure 3:
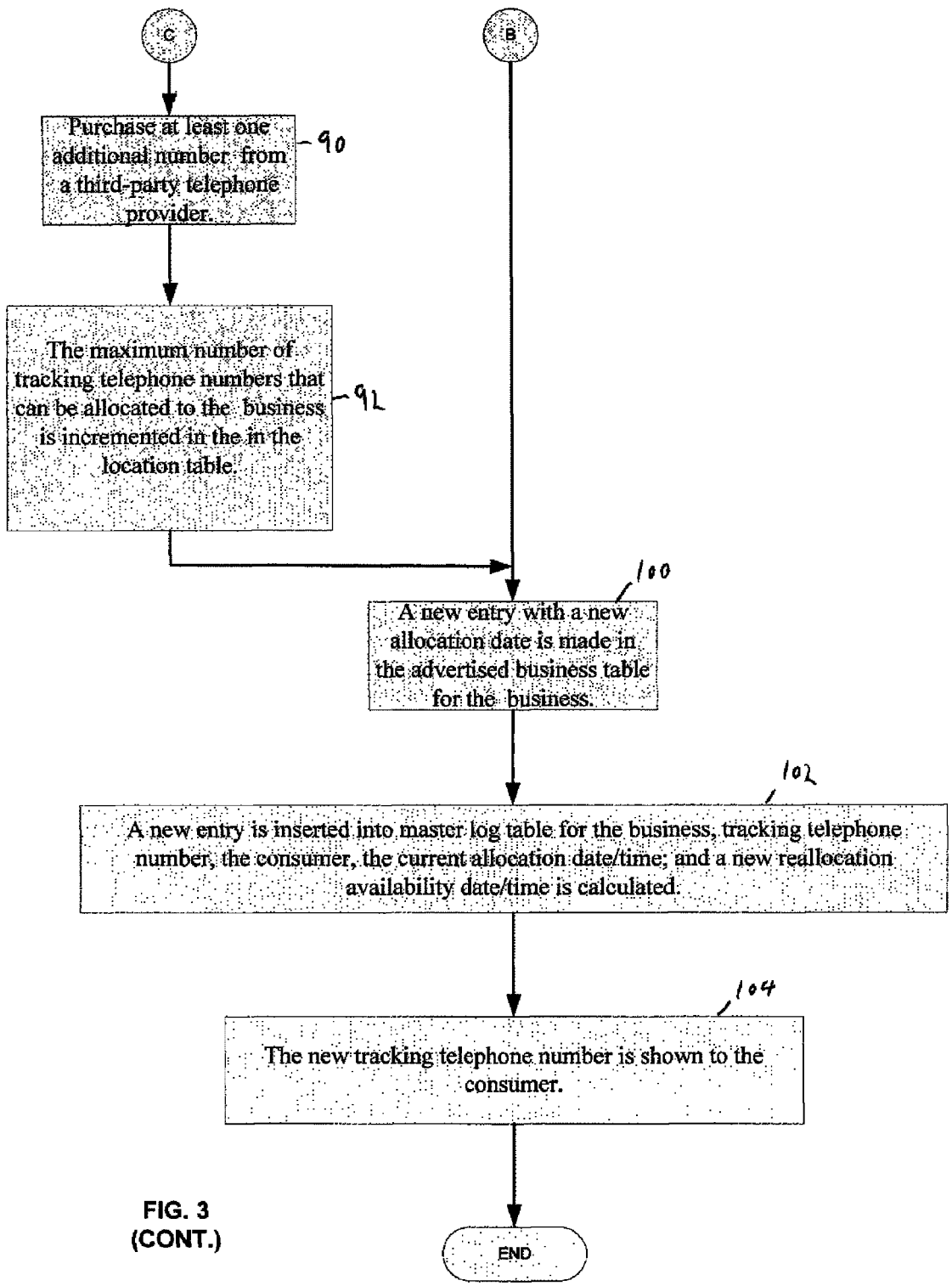

FIG. 3 is a flow diagram depicting a method for dynamically allocating and tracking call activity to a set of businesses 14, constructed in accordance with an embodiment of the present invention. Referring now to FIGS. 1, 2A-2D, and 3, the method begins by assuming that the global allocation table 24 of FIG. 2A has been populated with a list of tracking telephone numbers, and table 32 of FIG. 2B has been populated with data pertaining to the businesses 14.

At step 70, a consumer 20 views a Web site pertaining to one of the businesses 14. At step 72, the master log table 56 of FIG. 2D is searched in fields 60 and 68, respectively, for tracking telephone numbers belonging to the business 14 whose reallocation date is in the past, i.e., has expired. If at step 74, at least one such tracking telephone number were found, then the tracking telephone number whose expiration date is the oldest is chosen and shown to the consumer 20 on the Web site of the business 14 at step 76. The advertised business table 46 for the business 14 and the master log table 56 are updated with a new expiration date for the chosen tracked telephone number. The length of time allocated for the next expiration date may be set to a predetermined time from the current time that, in some embodiments, is based on a business/location-specific product of impression volume for that business and/or location and a location coefficient.

If, at step 74, no tracking telephone number for the business 14 was found or no tracking telephone number was found with an expiration date in the past, then at step 78, the location table 32 of FIG. 2B is consulted for the entry 34 corresponding to the business 14, the field 36 assigned to an business 14, and the field 40 listing the maximum number of tracking telephone numbers that can be allocated to the business 14 to determine if the maximum number of allowed numbers have been reached for the business 14. If the maximum number of allowed numbers has been exceeded, then at step 80, the fall back tracking telephone number in field 44 of FIG. 2B corresponding to the business 14 is shown to the consumer 20.

If, at step 78, the maximum number of allowed numbers for the business 14 has not been exceeded, then at step 82, the global allocation table 24 of FIG. 2A is searched for an unallocated number. If at step 84, there are no available unallocated numbers, then, in a preferred embodiment (Option 1) at step 86, the fall back tracking telephone number in field 44 of FIG. 2B corresponding to the business 14 is shown to the consumer 20. Optionally (Option 2), in some embodiments, at step 88, it is determined whether at least one additional number can be purchased from a third-party telephone provider which is then added to the global allocation table 24. If, at optional step 90, the additional number was purchased, then at step 92, the field 40 of FIG. 2B in the location table 32 corresponding to the maximum number of tracking telephone numbers that can be allocated to the business 14 is incremented. The logic then proceeds to step 100. Optionally (Option 3), in still other embodiments, if there are no available numbers, then at step 94, a calculation can be made based on the impression volume for the business 14 and on a predetermined coefficient to determine if a toll-free number can be allocated to business 14 and sent to the consumer 20. If, at step 96, the calculation indicates that a toll-free number is appropriate, then at step 98, the toll free number is shown to the consumer; otherwise, at step 86, the fallback tracking telephone number in field 44 of FIG. 2B corresponding to the business 14 is shown to the consumer 20.

If step 92 was executed, thereby incrementing the maximum number of tracking telephone numbers, or 98 if at step 84, an unallocated number is available, then at step 100, a new entry with a new allocation date is made in the advertised business table 46 of FIG. 2C for the business 14. At step 102, a new entry is inserted into master log table 56 tracks for the business 14, tracking telephone number, the consumer 20, the current allocation date/time; and a new reallocation availability date/time is calculated using the same procedure outlined in step 76. At step 104, the new tracking telephone number is shown to the consumer 20.

When the consumer 20 calls one of the tracking telephone numbers, the master log table 56 and the advertised business table 46 are consulted to determine to which business 14 to forward the call, i.e., the field 60 listing an allocated tracking phone number is matched against the field 64 listing the business 14 in the master log table 56. The business 14 is credited with the call assuming the consumer 20 in the field 62. More particularly, even if a prior consumer had called the same tracking telephone number now assigned to a new consumer, the business 14 is credited for the call since the tracking telephone number still belongs to the business 14 in the advertised business table 46. Then the field 54 listing the date and time of the last call to the allocated tracking telephone number is updated in the advertised business table 46.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed:

1. A method for tracking call activity of a plurality of businesses, comprising the steps of:
    deriving a business-specific pool of tracking telephone numbers from a global pool of tracking telephone numbers associated with the plurality of businesses, the business-specific pool being associated with one business of the plurality of businesses;
    receiving an indication that a consumer has viewed a Web site associated with the one business;
    searching for at least one tracking telephone number associated with the one business in the business-specific pool, the at least one tracking telephone number having an expiration date;
    when the at least one tracking telephone number that has an expiration date that has passed has been found:
        sending the at least one tracking telephone number to the Web site; and
    when the at least one tracking telephone number that has an expiration date that has passed has not been found:
        determining if the maximum number of allowed tracking telephone numbers in the business-specific pool for the one business has been exceeded;
        when the maximum number of allowed tracking telephone numbers in the business-specific pool for the one business has not been exceeded:
            showing a fallback tracking telephone number to the consumer; and
        when the maximum number of allowed tracking telephone numbers in the business-specific pool for the one business has been exceeded:
            searching for an unallocated tracking telephone number in the global pool of tracking telephone numbers;
            when there are no unallocated tracking telephone numbers in the global pool of tracking telephone numbers:
                showing a fallback tracking telephone number to the consumer; and
            when there are unallocated tracking telephone numbers in the global pool of tracking telephone numbers:
                inserting a new tracking telephone number to the business-specific pool of tracking telephone numbers for the one business from the global pool;
                associating the consumer with the new tracking telephone number;
                assigning a new expiration date to the new tracking telephone number; and
                sending the new tracking telephone number to the Web site.

2. The method of claim 1, further comprising the steps of, when the at least one tracking telephone number is found and the expiration date has passed:
    receiving a call using the at least one tracking telephone number from the consumer;
    associating the consumer with the at least one tracking telephone number;
    assigning a new expiration date to the at least one tracking telephone number;
    forwarding the call to the one business; and
    crediting the one business for the call.

3. The method of claim 2, further comprising the steps of:
    re-allocating the at least one tracking telephone number to a second consumer for the one business after the new expiration date has expired;
    receiving a call using the at least one tracking telephone number from the consumer,
    forwarding the call to the one business; and
    crediting the one business for the call.

4. The method of claim 1, wherein the at least one tracking telephone number whose expiration date has passed is the tracking telephone number associated with the one business with the oldest expiration date among a list of tracking telephone numbers, whose expiration dates have expired.

5. The method of claim 1, wherein the expiration date is calculated based on impression volume and a business-specific coefficient.

6. The method of claim 1, wherein the at least one tracking telephone number is de-allocated from the business-specific pool for the one business after a predetermined amount of time.

7. A method for tracking call activity of a plurality of businesses, comprising the steps of:
    deriving a business-specific pool of tracking telephone numbers from a global pool of tracking telephone numbers associated with the plurality of businesses, the business-specific pool being associated with one business of the plurality of businesses;
    receiving an indication that a consumer has viewed a Web site associated with the one business;
    searching for at least one tracking telephone number associated with the one business in the business-specific pool, the at least one tracking telephone number having an expiration date;
    when the at least one tracking telephone number that has an expiration date that has passed has been found:
        sending the at least one tracking telephone number to the Web site; and
    when the at least one tracking telephone number that has an expiration date that has passed has not been found:
        determining if the maximum number of allowed tracking telephone numbers in the business-specific pool for the one business has been exceeded;
        when the maximum number of allowed tracking telephone numbers in the business-specific pool for the one business has not been exceeded:
            showing a fallback tracking telephone number to the consumer; and
        when the maximum number of allowed tracking telephone numbers in the business-specific pool for the one business has been exceeded:
            searching for an unallocated tracking telephone number in the global pool of tracking telephone numbers;
            attempting to purchase an additional number from a third party telephone provider;

when an additional number from a third party telephone provider cannot be purchased:
  showing the fallback tracking telephone number to the consumer; and
when an additional number from a third party telephone provider can be purchased:
  purchasing an additional number from a third party telephone provider;
  incrementing a maximum number of tracking telephone numbers that are allocated to the one business;
  inserting a new tracking telephone number to the business-specific pool of tracking telephone numbers for the one business from the global pool;
  associating the consumer with the new tracking telephone number;
  assigning a new expiration date to the new tracking telephone number; and
  sending the new tracking telephone number to the Web site.

8. The method of claim 7, further comprising the steps of, when the at least one tracking telephone number is found and the expiration date has passed:
  receiving a call using the at least one tracking telephone number from the consumer;
  associating the consumer with the at least one tracking telephone number;
  assigning a new expiration date to the at least one tracking telephone number;
  forwarding the call to the one business; and
  crediting the one business for the call.

9. The method of claim 8, further comprising the steps of:
  re-allocating the at least one tracking telephone number to a second consumer for the one business after the new expiration date has expired;
  receiving a call using the at least one tracking telephone number from the consumer, forwarding the call to the one business; and
  crediting the one business for the call.

10. The method of claim 7, wherein the at least one tracking telephone number whose expiration date has passed is the tracking telephone number associated with the one business with the oldest expiration date among a list of tracking telephone numbers, whose expiration dates have expired.

11. The method of claim 7, wherein the expiration date is calculated based on impression volume and a business-specific coefficient.

12. The method of claim 7, wherein the at least one tracking telephone number is de-allocated from the business-specific pool for the one business after a predetermined amount of time.

13. A system for tracking call activity of a plurality of businesses, comprising:
  a data storage device;
  at least one processor communicatively connected to the data storage device and executing a plurality of software modules, the software modules being configured for:
  deriving a business-specific pool of tracking telephone numbers from a global pool of tracking telephone numbers associated with the plurality of businesses, the business-specific pool being associated with one business of the plurality of businesses, the business-specific pool and the global pool being stored in the data storage device;
  receiving an indication that a consumer has viewed a Web site associated with the one business;
  searching for at least one tracking telephone number associated with the one business in the business-specific pool, the at least one tracking telephone number having an expiration date;
  when the at least one tracking telephone number that has an expiration date that has passed has been found:
    sending the at least one tracking telephone number to the Web site; and
  when the at least one tracking telephone number that has an expiration date that has passed has not been found:
    determining if the maximum number of allowed tracking telephone numbers in the business-specific pool for the one business has been exceeded;
    when the maximum number of allowed tracking telephone numbers in the business-specific pool for the one business has not been exceeded:
      showing a fallback tracking telephone number to the consumer; and
    when the maximum number of allowed tracking telephone numbers in the business-specific pool for the one business has been exceeded:
      searching for an unallocated tracking telephone number in the global pool of tracking telephone numbers;
      when there are no unallocated tracking telephone numbers in the global pool of tracking telephone numbers:
        showing a fallback tracking telephone number to the consumer; and
      when there are unallocated tracking telephone numbers in the global pool of tracking telephone numbers:
        inserting a new tracking telephone number to the business-specific pool of tracking telephone numbers for the one business from the global pool;
        associating the consumer with the new tracking telephone number;
        assigning a new expiration date to the new tracking telephone number; and
        sending the new tracking telephone number to the Web site.

14. The system of claim 13, wherein the plurality of software modules is further configured for, when the at least one tracking telephone number is found and the expiration date has passed in the data storage device:
  receiving a call using the at least one tracking telephone number from the consumer;
  associating the consumer with the at least one tracking telephone number;
  assigning a new expiration date to the at least one tracking telephone number;
  forwarding the call to the one business; and
  crediting the one business for the call.

15. The system of claim 14, wherein the plurality of software modules is further configured for:
  re-allocating the at least one tracking telephone number to a second consumer for the one business after the new expiration date has expired;
  receiving a call using the at least one tracking telephone number from the consumer;
  forwarding the call to the one business; and
  crediting the one business for the call.

16. The system of claim 13, wherein the at least one tracking telephone number whose expiration date has passed is the tracking telephone number associated with the one business with the oldest expiration date among a list of tracking telephone numbers whose expiration dates have expired.

17. The system of claim 13, wherein the expiration date is calculated based on impression volume and a business-specific coefficient.

18. The system of claim 13, wherein the at least one tracking telephone number is de-allocated from the business-specific pool for the one business after a predetermined amount of time and returned to the global pool of tracking telephone numbers.

19. A system for tracking call activity of a plurality of businesses, comprising:
a data storage device;
at least one processor communicatively connected to the data storage device and executing a plurality of software modules, the software modules being configured for:
deriving a business-specific pool of tracking telephone numbers from a global pool of tracking telephone numbers associated with the plurality of businesses, the business-specific pool being associated with one business of the plurality of businesses, the business-specific pool and the global pool being stored in the data storage device;
receiving an indication that a consumer has viewed a Web site associated with the one business;
searching for at least one tracking telephone number associated with the one business in the business-specific pool, the at least one tracking telephone number having an expiration date;
when the at least one tracking telephone number that has an expiration date that has passed has been found:
sending the at least one tracking telephone number to the Web site; and
when the at least one tracking telephone number that has an expiration date that has passed has not been found:
determining if the maximum number of allowed tracking telephone numbers in the business-specific pool for the one business has been exceeded;
when the maximum number of allowed tracking telephone numbers in the business-specific pool for the one business has not been exceeded:
showing a fallback tracking telephone number to the consumer; and
when the maximum number of allowed tracking telephone numbers in the business-specific pool for the one business has been exceeded:
searching for an unallocated tracking telephone number in the global pool of tracking telephone numbers;
attempting to purchase an additional number from a third party telephone provider;
when an additional number from a third party telephone provider cannot be purchased:
showing the fallback tracking telephone number to the consumer; and
when an additional number from a third party telephone provider can be purchased:
purchasing an additional number from a third party telephone provider;
incrementing a maximum number of tracking telephone numbers that are allocated to the one business;
inserting a new tracking telephone number to the business-specific pool of tracking telephone numbers for the one business from the global pool;
associating the consumer with the new tracking telephone number;
assigning a new expiration date to the new tracking telephone number; and
sending the new tracking telephone number to the Web site.

20. The system of claim 19, wherein the plurality of software modules is further configured for, when the at least one tracking telephone number is found and the expiration date has passed in the data storage device:
receiving a call using the at least one tracking telephone number from the consumer;
associating the consumer with the at least one tracking telephone number;
assigning a new expiration date to the at least one tracking telephone number;
forwarding the call to the one business; and
crediting the one business for the call.

21. The system of claim 20, wherein the plurality of software modules is further configured for:
re-allocating the at least one tracking telephone number to a second consumer for the one business after the new expiration date has expired;
receiving a call using the at least one tracking telephone number from the consumer;
forwarding the call to the one business; and
crediting the one business for the call.

22. The system of claim 19, wherein the at least one tracking telephone number whose expiration date has passed is the tracking telephone number associated with the one business with the oldest expiration date among a list of tracking telephone numbers whose expiration dates have expired.

23. The system of claim 19, wherein the expiration date is calculated based on impression volume and a business-specific coefficient.

24. The system of claim 19, wherein the at least one tracking telephone number is de-allocated from the business-specific pool for the one business after a predetermined amount of time and returned to the global pool of tracking telephone numbers.

25. A non-transitory computer-readable medium carrying one or more sequences of instructions for tracking call activity of a plurality of businesses, wherein execution of the one of more sequences of instructions by one or more processors causes the one or more processors to perform the steps of:
deriving a business-specific pool of tracking telephone numbers from a global pool of tracking telephone numbers associated with the plurality of businesses, the business-specific pool being associated with one business of the plurality of businesses;
receiving an indication that a consumer has viewed a Web site associated with the one business;
searching for at least one tracking telephone number associated with the one business in the business-specific pool, the at least one tracking telephone number having an expiration date;
when the at least one tracking telephone number that has an expiration date that has passed has been found:
sending the at least one tracking telephone number to the Web site; and
when the at least one tracking telephone number that has an expiration date that has passed has not been found:
determining if the maximum number of allowed tracking telephone numbers in the business-specific pool for the one business has been exceeded;
when the maximum number of allowed tracking telephone numbers in the business-specific pool for the one business has not been exceeded:

showing a fallback tracking telephone number to the consumer; and when the maximum number of allowed tracking telephone numbers in the business-specific pool for the one business has been exceeded:

searching for an unallocated tracking telephone number in the global pool of tracking telephone numbers;

when there are no unallocated tracking telephone numbers in the global pool of tracking telephone numbers:

showing a fallback tracking telephone number to the consumer; and when there are unallocated tracking telephone numbers in the global pool of tracking telephone numbers:

inserting a new tracking telephone number to the business-specific pool of tracking telephone numbers for the one business from the global pool;

associating the consumer with the new tracking telephone number;

assigning a new expiration date to the new tracking telephone number; and sending the new tracking telephone number to the Web site.

26. The non-transitory computer-readable medium of claim 25, further comprising the steps of, when the at least one tracking telephone number is found and the expiration date has passed:

receiving a call using the at least one tracking telephone number from the consumer;

associating the consumer with the a least one tracking telephone number;

assigning a new expiration date to the at least one tracking telephone number;

forwarding the call to the one business; and crediting the one business for the call.

27. The non-transitory computer-readable medium of claim 26, further comprising the steps of:

re-allocating the at least one tracking telephone number to a second consumer for the one business after the new expiration date has expired;

receiving a call using the at least one tracking telephone number from the consumer;

forwarding the call to the one business; and crediting the one business for the call.

28. The non-transitory computer-readable medium of claim 25, wherein the at least one tracking telephone number whose expiration date has passed is the tracking telephone number associated with the one business with the oldest expiration date among a list of tracking telephone numbers, whose expiration dates have expired.

29. The non-transitory computer-readable medium of claim 25, wherein the expiration date is calculated based on impression volume and a business-specific coefficient.

30. The non-transitory computer-readable medium of claim 25, wherein the at least one tracking telephone number is de-allocated from the business-specific pool for the one business after a predetermined amount of time.

31. A non-transitory computer-readable medium carrying one or more sequences of instructions for tracking call activity of a plurality of businesses, wherein execution of the one of more sequences of instructions by one or more processors causes the one or more processors to perform the steps of:

deriving a business-specific pool of tracking telephone numbers from a global pool of tracking telephone numbers associated with the plurality of businesses, the business-specific pool being associated with one business of the plurality of businesses;

receiving an indication that a consumer has viewed a Web site associated with the one business;

searching for at least one tracking telephone number associated with the one business in the business-specific pool, the at least one tracking telephone number having an expiration date;

when the at least one tracking telephone number that has an expiration date that has passed has been found:

sending the at least one tracking telephone number to the Web site; and when the at least one tracking telephone number that has an expiration date that has passed has not been found:

determining if the maximum number of allowed tracking telephone numbers in the business-specific pool for the one business has been exceeded;

when the maximum number of allowed tracking telephone numbers in the business-specific pool for the one business has not been exceeded:

showing a fallback tracking telephone number to the consumer; and when the maximum number of allowed tracking telephone numbers in the business-specific pool for the one business has been exceeded:

searching for an unallocated tracking telephone number in the global pool of tracking telephone numbers;

attempting to purchase an additional number from a third party telephone provider;

when an additional number from a third party telephone provider cannot be purchased:

showing the fallback tracking telephone number to the consumer; and when an additional number from a third party telephone provider can be purchased:

purchasing an additional number from a third party telephone provider;

incrementing a maximum number of tracking telephone numbers that are allocated to the one business;

inserting a new tracking telephone number to the business-specific pool of tracking telephone numbers for the one business from the global pool;

associating the consumer with the new tracking telephone number;

assigning a new expiration date to the new tracking telephone number; and sending the new tracking telephone number to the Web site.

32. The non-transitory computer-readable medium of claim 31, further comprising the steps of, when the at least one tracking telephone number is found and the expiration date has passed:

receiving a call using the at least one tracking telephone number from the consumer;

associating the consumer with the a least one tracking telephone number;

assigning a new expiration date to the at least one tracking telephone number;

forwarding the call to the one business; and crediting the one business for the call.

33. The non-transitory computer-readable medium of claim 32, further comprising the steps of:

re-allocating the at least one tracking telephone number to a second consumer for the one business after the new expiration date has expired;

receiving a call using the at least one tracking telephone number from the consumer;

forwarding the call to the one business; and crediting the one business for the call.

34. The non-transitory computer-readable medium of claim 31, wherein the at least one tracking telephone number whose expiration date has passed is the tracking telephone number associated with the one business with the oldest expiration date among a list of tracking telephone numbers, whose expiration dates have expired.

35. The non-transitory computer-readable medium of claim 31, wherein the expiration date is calculated based on impression volume and a business-specific coefficient.

36. The non-transitory computer-readable medium of claim 31, wherein the at least one tracking telephone number is de-allocated from the business-specific pool for the one business after a predetermined amount of time.

* * * * *